United States Patent [19]

Wegener

[11] 4,417,639

[45] Nov. 29, 1983

[54] DYNAMIC GAS PRESSURED JACKING STRUCTURE WITH IMPROVED LOAD STABILITY AND AIR PALLET EMPLOYING SAME

[76] Inventor: Jack Wegener, 830 Chambers Ave., Gloucester City, N.J. 08030

[21] Appl. No.: 322,035

[22] Filed: Nov. 16, 1981

[51] Int. Cl.$^3$ .......... B60V 1/04

[52] U.S. Cl. .......... 180/125; 180/124; 180/128; 254/93 HP; 414/676

[58] Field of Search .......... 180/116, 124, 125, 128; 414/676; 254/93 HP; 285/7, 205, 208, 209, 210

[56] References Cited

U.S. PATENT DOCUMENTS

| | | | |
|---|---|---|---|
| 3,185,238 | 5/1965 | Coates | 180/125 |
| 3,799,504 | 3/1974 | Vaughen | 254/93 HP |
| 3,948,344 | 4/1976 | Johnson et al. | 180/124 |
| 3,954,153 | 5/1976 | Croix-Marie et al. | 180/124 |
| 4,155,421 | 5/1979 | Johnson et al. | 180/125 |

FOREIGN PATENT DOCUMENTS

| | | | |
|---|---|---|---|
| 1072884 | 6/1967 | United Kingdom | 254/93 HP |

*Primary Examiner*—Joseph F. Peters, Jr.
*Assistant Examiner*—Kenneth R. Rice
*Attorney, Agent, or Firm*—Sughrue, Mion, Zinn, Macpeak, and Seas

[57] ABSTRACT

A pair of relatively rigid planar members overlying each other are coupled about their edges by a flexible film band to form a jacking plenum chamber. The upper planar member functions as the load support, bearing a gas inlet hole adjacent one edge whose diameter is approximately twice the size of an outlet hole adjacent the edge of the underlying planar member to the opposite end of the jacking plenum chamber whereby, a gas under pressure entering on end of the jacking plenum chamber and escaping through the outer end, functions to jack the load and upper relatively rigid planar member to a height defined by the height of the flexible band. The holes at the opposite ends of the chamber provide load stabilization during jacking. The lower rigid member may further bear a thin flexible sheet perforated over a major central portion which is edged jointly to the lower planar member to define an air bearing planar chamber therebetween with the assembly functioning as an air pallet with integral jacking chamber. Side by side separate air inlets to the jacking plenum chamber and the air bearing plenum chamber are fed by a slidable valve member bearing the pressurized gas supply permits the selective jacking, air bearing or combined action. One or more tubes bearing perforations on the lower surface and selectively pressurized or subject to vacuum pressure penetrate into cavities beneath a conventional wooden pallet to effect a combined air pallet and jacking application to conventional wooden pallets, with ease of entry and removal of the combined air pallet and jacking tube or tubes.

18 Claims, 10 Drawing Figures

DYNAMIC GAS PRESSURED JACKING STRUCTURE WITH IMPROVED LOAD STABILITY AND AIR PALLET EMPLOYING SAME

FIELD OF THE INVENTION

This invention relates to a dynamic gas pressurized jacking system and to such a jacking system integrated to air pallets.

BACKGROUND OF THE INVENTION

Planar air pallets have evolved over the years for supporting a load for a relatively frictionless transport over a fixed support surface by means of an air film between the planar air pallet and the underlying support surface. Such structures employ in many cases a single sheet of flexible plastic film bearing the perforations which unrestrictably open to an internal plenum chamber into which the air passes to form the air bearing. They are the subject matter of U.S. Pat. Nos. 3,948,344 and 4,155,421 to Raynor A. Johnson and William D. Fletcher issuing Apr. 6, 1976 and May 22, 1979, respectively.

Such planar air pallets are characterized by a relatively rigid planar backing member normally bearing the load (or formed by the load itself) about the edge of which are sealed the edges of a single sheet of flexible plastic film which underlies the load and the backing member and overlies the support surface with the sheet being perforated centrally and except the perimeter. The sheet forms with the backing member an air bearing plenum chamber. An air tube or hose is coupled to a fitting usually borne by the relatively rigid planar backing member or within the flexible sheet or film bearing the perforations at a non-perforated area to permit air pressuration of the air bearing plenum chamber. Pillowing of the sheet portion of the plenum chamber is controlled to permit jacking of the load sufficiently to accommodate surface irregularities for both the load support surface and the backing surface. In another form, the air pallet comprises a flexible film bag, the bottom of which carries the perforation and the top of which is affixed to the bottom of the load itself.

Air dispersion means are required to ensure dispersion of the air from the air inlet to the extremities of the air bearing plenum chamber to effect the two-fold function of initially jacking the load and permit the air to reach the perforations within the thin flexible bottom sheet to form a thin film air bearing between that sheet and the underlying support surface. Difficulties have been encountered in effecting full and complete air dispersion throughout the plenum chamber, and in effecting jacking without inclining the relatively rigid backing member and tipping over of the load and without damage and destruction to the planar air pallet.

It is therefore a primary object of the present invention to provide an improved load stable dynamic gas pressurized jacking structure of simplified construction and such jacking structure as employed as an element of and in conjunction with planar air pallets.

DESCRIPTION OF THE PREFERRED EMBODIMENTS

With respect to the multiple embodiments of the invention, like elements are provided with like numerical designations. Further, all of the embodiments of the invention, constituting air pallets in one form or the other, are in accordance with the teachings of the aforementioned patents.

Figure 1:
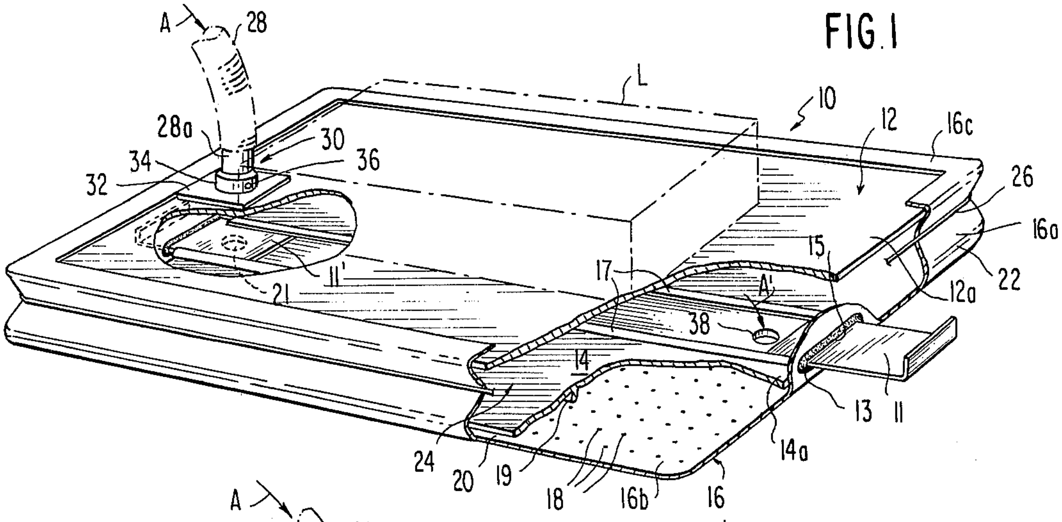
FIG. 1 is a perspective view, partially broken away of an air pallet with an improved dynamic gas pressurized jacking structure forming one embodiment of the invention.

Referring first to FIG. 1, a first embodiment of the invention is directed to an improved air pallet with integral dynamic jacking chamber indicated generally at 10. The air pallet 10 comprises three basic components: a first relatively rigid planar backing member indicated generally at 12; a second relatively rigid planar jacking member indicated generally at 14; and a thin flexible bottom sheet indicated generally at 16. All of these elements are generally of rectangular plan configuration. Purposely the thin flexible bottom sheet 16 is both wider and longer than planar members 12 and 14. The members 12 and 14 are of the same length and width dimensions although such is not essential. The thin flexible sheet 16 is provided with a peripheral portion or integral flexible band **16*a* extending upwardly from the perforated central bottom portion 16*b* of sheet 16 with the edge 16*c* of the flexible band 16*a* being thermal bonded, adhesively bonded, or the like to the edge 12*a* of the upper, relatively rigid planar member 12. Further, the perforated portion 16*b* of the sheet bears perforations as at 18, underlies the intermediate, relatively rigid planar member jacking member 14 and is spaced therefrom some distance when the air bearing plenum chamber indicated generally at 20 is air pressurized. In that regard, the peripheral edge 14*a* of the intermediate relatively rigid planar jacking member 14 is thermal bonded, adhesively bonded or otherwise sealed to the flexible band 16*a* along a line 22 at some vertical height above the perforated bottom central portion 16*b* of the thin flexible sheet 16. Thus, the upper, relatively rigid planar backing member 12 and the intermediate relatively rigid planar jacking member 14 define a second, jacking plenum chamber 24 which is initially subject to a gas pressurization. All of the embodiments of the invention are subject to gas pressurization, normally compressed air. Such terms as air and gas are interchangably employed although, any fluid even a liquid under pressure may be employed to achieve the desired results. The flexible band 16***a* preferably gives a corrugated effect to the side wall of the assembly, between the planar members 12 and 14, and such is purposely effected either by making this band semi-rigid, or, as illustrated, by the utilization of an elastic string 26 which completely surrounds the structure and is mounted onto the band, intermediate of its top and bottom edges, and which, when the structure 10 is not subject to gas pressurization attempts to flatten the assembly and pull the planar members 12 and 14 into surface contact with each other.

Figure 2:
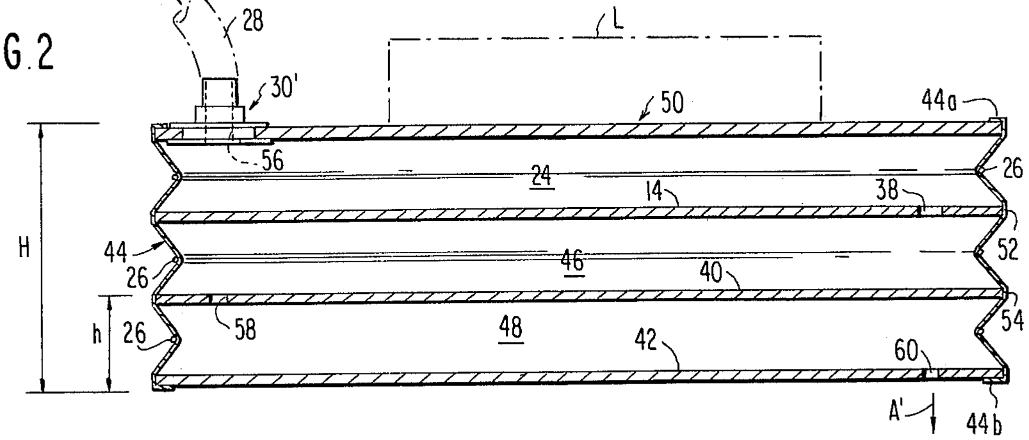
FIG. 2 is a vertical sectional view of a multi-chamber dynamic gas pressurized jacking structure forming another embodiment of the present invention.
Figure 3:
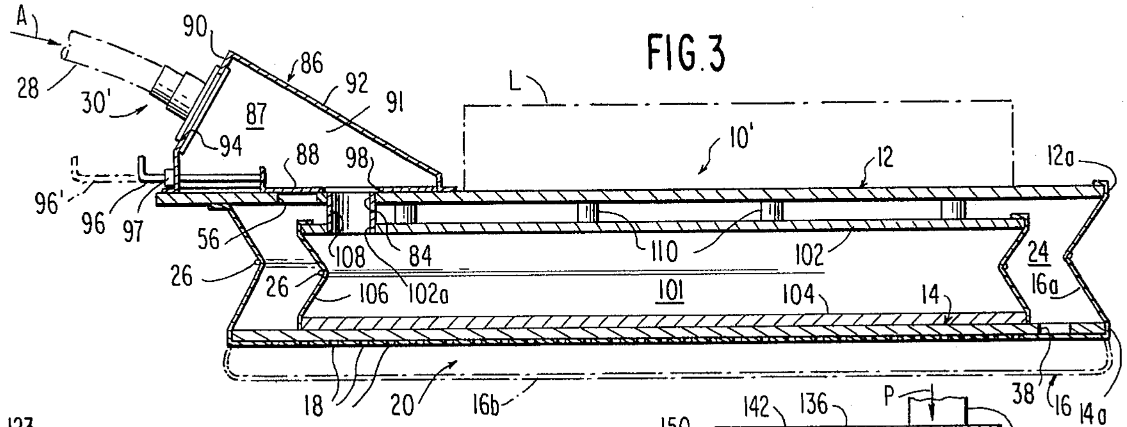
FIG. 3 is a vertical sectional view of an air pallet and a dynamic gas pressurized jacking structure forming at the third embodiment of the present invention.

Very important to the present invention, is the nature in which the gas (air) under pressure enters the jacking plenum chamber 24 and flows therethrough under a dynamic gas pressured jacking operation, for the air pallet 10, and similarly effected within other embodiments of the present invention, illustrated at FIGS. 2 and 3. As may be appreciated, gas under pressure must enter between the planar members 12 and 14 and within the jacking plenum chamber 24 essentially sealed off by the flexible band 16*a* of flexible sheet member 16. A source of compressed air or the like (arrow A) is fed through a flexible hose as at 28, the air under pressure entering the interior of the jacking plenum chamber 24 via an affixed tubular coupling indicated generally at 30. The coupling comprises a flat square plate 32 bearing a central opening (not shown) defined by a circular collar 34 which may be integral with plate 32. The flexible tube 28 terminates in a non-flexible reduced diameter tubular portion 28*a* which sealably fits the interior of collar 34 and which may be screw coupled thereto by way of one or more screws 36. The plate 32 and or collar 34 define an air inlet opening whose diameter is of a given size. The dynamic gas pressurized jacking structure operates under the principle wherein; since the jacking plenum chamber 24 is essentially an imperforate chamber other than the inlet and outlet (inlet defined by a coupling 30) and an outlet defined by a circular opening 38 a continuous flow of gas (air) under pressure passes through the chamber 24 and exits the outlet opening 38 whose cross-section, is approximately one-half that of the air inlet opening to the jacking plenum chamber 24. Further, the invention is premised on having the inlet opening at the opposite end of the assembly forming the jacking structure as defined by the relatively rigid planar members 12 and 14 and flexible band 16*a* from outlet 38, that is at laterally spaced position relative to a load L. The air enters as indicated by arrow A through flexible tube 28 and leaves the jacking chamber 24 as indicated by arrow A′ through the outlet hole 38. Outlet hole 38 is essentially the inlet to the second, air bearing plenum chamber 20 immediately below the jacking plenum chamber 24 and separated therefrom by the intermediate relatively rigid planar jacking member 14. There is further formed, a basic air pallet in the manner of the aforementioned patent by intermediate, relatively rigid planar backing member 14 and the perforated thin flexible bottom sheet 16, whose periphery surrounds and is sealed to the peripheral edge 14*a* of member 14 by adhesive or the like.

The air pallet 10 is adapted to bear load, as at L, which is centrally mounted to the air pallet and which is jacked uniformly vertically upward initially, by flow of air under pressure as indicated by arrow A into the interior of the jacking plenum chamber 24. If necessary, air distribution means in the form of strips or the like mounted to or integrally projecting downwardly from the bottom surface of the intermediate relatively rigid planar jacking member 14 ensure the subsequent dispersion of air throughout the underlying air bearing plenum chamber 20. The air rushes through the perforations 18 to form the thin film air bearing upon ballooning of the flexible band 16 of the thin flexible sheet 16. This occurs to the extent where, air leaves freely through the outer row or rows of perforation 18, adjacent flexible band 16*a*, thereby effectively stabilizing the load L at a given vertical height as defined by a physical make-up of the air pallet 10 and the mass of the load L. The members 12 and 14 may be formed of wood such as plywood panels or of cardboard etc., and the thin flexible sheet 16 may be formed of a polyethylene or like plastic film. This is true for the other embodiments of the invention.

It should be remembered, that it is the cross-sectional area of the inlet opening as contrasted to the single and, opposite end disposed, outlet opening for the jacking structure that permits the dynamic gas pressurized jack to operate with load stabilizing effect in jacking the load upwardly.

The description of the embodiment of FIG. 1 to this extent is directed to a simplified air pallet incorporating the dynamic air jacking structure as a component thereof with hole 38 continuously open and functioning as the outlet for the upper plenum chamber 24 and leading to the lower plenum chamber 20. The embodiment also uses two slide valves functioning as guillotines which are optional to the structure and which permits the structure to be employed either solely as an air jack, initially as an air jacking structure, and subsequently as an air pallet, or solely as an air pallet without filling of the upper plenum chamber 24 and thus without special means for jacking of the load L. A first slide valve, which may take the form of a mylar sheet or the like as at 11, projects through band portion 16*a* of the thin flexible sheet 16 at a seal 13 which surrounds an elongated slit 15. The mylar sheet is of elongated rectangular form such that its edges are guided by laterally opposed tracks 17 to each side of hole 38. Tracks 17 are mounted on the upper face of the lower relatively rigid planar member 14. The tracks 17 may in fact extend completely across the length of planar member 14 and function as air dispersion means for plenum chamber 24. Similarly, ribs or the like as at 19 may extend across the bottom of planar member 14 to provide the necessary air dispersion means to plenum chamber 20. Such ribs or like air dispersion means 19 are not necessary, particularly where the air inlet 56 is to one side of the load and the outlet 36 for the air jacking structure or the air pallet portion as defined by plenum chamber 20 is to the opposite side of the load L, and outside of the same.

As illustrated, the tracks 17, in extending the full length, permit the engagement of a second slide valve 11′ covering a further hole 21 sized similar to and opposite that functioning as the inlet hole 56 for the fluid stream as at A entering plenum chamber 24 of the jacking structure. Being aligned with and directly underlying the incoming fluid stream, when the slide valve 11′ is slid to hole open position, the stream of fluid under pressure bypasses plenum chamber 24 and enters directly into the lower plenum chamber 20, FIG. 1. This effects limited jacking of the load, and the creation of the desired air bearing beneath the perforations 18 of the thin flexible sheet 16 at its center portion so as to permit load L to be moved frictionlessly across an underlying support surface. Again, slide valve 11' has a portion extending through the wall or band 16a sealed by way of a seal 13 in the identical manner of valve 11 and projecting through an opening formed by the seal 13 such that regardless of whether the slide valves 11 or 11' are in open or closed position, pressurized fluid cannot escape from chamber 24 along the surface of the mylar sheet or otherwise formed slide valves 11 and 11'.

With slide valve 11 open and slide valve 11' closed, operation is as described above with respect to the embodiment of FIG. 1. With slide valve 11' and slide valve 11 closed, only jacking occurs and no air bearing is created. The pressure within plenum chamber 24 rises until the back pressure matches that produced by the source of air under pressure, as indicated by arrow A and the extent of load jacking for load L is determined by the mass of the load and the pressure of the fluid stream A.

With slide valve 11 closed and slide valve 11' open, the structure acts as a conventional air pallet in the form of the patents recited above, with limited jacking of load L, determined purely by the enlargement of plenum chamber 20.

Referring next to FIG. 2, a second embodiment of the invention is directed to a multi-chamber jacking structure indicated generally at 50. This comprises, in order, an upper relatively rigid planar load backing member 12, a first relatively rigid planar jacking member 14, a second relatively rigid planar jacking member 40, and yet a third relatively rigid planar jacking member 42 which is the bottom element of the jacking structure. Each of the planar members 14, 40 and 42 are identically sized to the relatively rigid planar backing member 12 which directly bears load L. Further, a plurality of jacking plenum chambers are formed, the first as at 24 between members 12 and 14, the second 46 between members 14 and 40 and the third 48 between members 40 and 42. A thin flexible band 44 formed of polyethylene film or the like of a given thickness, is in the form of a continuous loop, has its upper and lower edges 50a and 50b, sealed to the periphery of the upper most relatively rigid planar member and the lower most at 44, respectively. Further, elastic strings 26 contact sections or portions of band 44 which portions are edge sealed as at 52 and 54 to the peripheries of the intermediate relatively rigid planar jacking members 14 and 42, thereby defining essentially sealed jacking plenum chambers as at 24, 46 and 48. An air inlet opening 56 is formed by a air hose coupling 30' which is structurally somewhat different from coupling 30 of the embodiment of FIG. 1. A hole 38 identical to that is formed within a relatively rigid planar jacking member 14 of FIG. 1 is at the end of the chamber 24 opposite that of inlet opening 56 for jacking structure 50. The hole 38 acts in a dynamic fashion to permit further gas pressurization of the intermediate plenum chamber 46. In similar fashion to relatively rigid planar members 12 and 14, there is a single hole as at 58 within the planar member 42 at the end of the assembly opposite that bearing a hole 38 and, for the bottom most relatively rigid planar member 44, a hole 60 is provided which functions as the gas discharge hole for the jacking structure 50. Under the dynamic gas pressurizing principle, as may be appreciated, hole 38 has a cross-sectional area approximately one-half that of hole 56, hole 58 has a cross-sectional area which is approximately one-half that of hole 38 and hole 60 has a cross-sectional area which is approximately one-half of that of hole 58. With the members 14 and 42 bonded to the flexible band 50 along with members 12 and 44 at equally spaced distances (from respective adjacent members), there is produced upon application of gas, i.e., air pressure as indicated by arrow A to fitting 31 through a flexible hose 28 an effective vertical jacking of load L relative to the lower most planar member 44 to a height H which is three times the height h, as indicated by the arrows, as if, a single plenum chamber were provided by the jacking structure in the most simplified form of the novel dynamic jacking structure under the principles of the present invention. Very high stability of the load during jacking is effected particularly by utilization of the multi-plenum chamber structure illustrated in FIG. 2. As may be appreciated, by modifying the structure and utilization of a thin flexible sheet such as sheet 16 in the embodiment of FIG. 1, sealed to and underlying the lower most relatively rigid planar member 44, the jacking structure of FIG. 2 could form an air pallet with integrated multiple jacking chambers.

As may be further appreciated, it is possible to employ a slide valve or its equivalent as at 11, FIG. 1, for controlling the air flow through opening or hole 60 within the lower, relatively rigid planar member 42. Alternatively, the hole 60 could be eliminated so that in the dynamic pressurized air jacking structure, progressive jacking of the load L occurs through chambers 24, 46 and 48 to the extent where finally the back pressure within these chambers, all in fluid communication by way of holes 38 and 58, matches the pressure of the applied fluid stream A, such as air, or water (or like liquid) entering the inlet opening or hole 56 for plenum chamber 24. Further, the outlet hole 60 functions as an anti-ballooning device since in the dynamic pressurized air jacking system, the generally rigid planar members 12, 14, 40 and 42 move apart to jack the load L vertically upwardly to a predetermined limited extent defined by certain parameters including the ratio of the cross-sections of the initial air inlet opening 56 to chamber 24 to the outlet opening 60 for the lowermost chamber 48.

Referring next to FIGS. 6 through 9 inclusive, the detachable coupling 30' of FIG. 2 is detailed. It provides the source of pressurized air to the jacking structure 50 (or to an equivalently provided air pallet, such as air pallet 10 of FIG. 2) to quickly effect jacking of a load L. A relatively large rectangular opening as at 62 is provided within the upper relatively rigid planar backing member 12. The opening 62 may be square, for example, as occurs in the illustrated embodiment. In terms of coupling 30', the coupling constitutes an assembly of elements including a tubular member as at 28a' to which the end of flexible hose 28 is sealably connected by being glued or otherwise adhesively attached to the outer periphery of tubular member 28a', at the upper end thereof. The tubular member 28a' terminates, at its lower end, in an integral flange 64 which is required to be larger in diameter than the width of opening 62. The flange may be rectangular in flange configuration or circular. In the illustrated embodiment the flange is is square. Further, the flange 64 is stepped as at 66, to provide an integral step portion 68, in this case of similar rectangular configuration and matching dimension wise the rectangular hole 62, within which it neatly fits. As may be appreciated, when fitting 30 is mounted to the relatively rigid planar member 12 the lip portion 64*a* of flange 64 rests on the surface of member 12 about the periphery of opening 62, with step portion 68 nested within the opening. The thickness of the nested portion 68 is approximately equal to the thickness of the relatively rigid planar member 12. The coupling 30 is completed by a rotatable locking assembly indicated generally at 70 and composed of a short length tube 72 of an outside diameter less than the inside diameter of tube 28*a*'. Further, within tube 28*a*' there is provided a pair of circumferentially spaced, horizontal slots 74 through which protrude a pair of screws 76, whose head ends project through holes 78 within an annular collar 80. The collar 80 rotates on the flange 64 and causes the smaller diameter tube 72 to rotate therewith when the collar is rotated. Further, the smaller diameter tube 72 is integrally provided at its bottom with a flange 82, which, in the illustrated embodiment is of a square planar cross-section and sized to the step portion 68 of flange 64. When the collar 80 is rotated to the position shown in FIGS. 8 and 9, the corners 82*a* of the flange 82 rotate to positions so that they underly the relatively rigid planar support member 12 outside of the opening 62 and thus physically lock the coupling 30' to member 12 of the multi-chamber jacking structure 50 in this embodiment of the invention. If necessary, seals may be provided to either flange 64, flange 82, or to the relatively rigid planar member 12 although such may not be necessary due to the relatively low gas pressurization utilized in jacking structure 50 or in any of the air pallet structures shown, if such coupling is provided thereto, all of which is encompassed by the present invention.

As may be appreciated, flange 82 could be of circular configuration but eccentric with respect to the axis hole 62 which itself would be of circular configuration rather than being rectangular. Alternatively, both the hole 62 and the flange 82 could be elliptic and locking would occur by right angle orientation of one longitudinal axis of the ellipse of the flange borne by the internal tube relative to the elliptical opening within the relatively rigid planar member such as member 12.

Flange 82 may carry a series of circumferentially spaced, radial projections or ribs as at 82*a* which permits air to seep radially outwardly between the relatively rigid planar member 12 and the underlying thin flexible sheet. Where the coupling is applied to a more conventional air pallet involving only a single, generally rigid planar member 12 and an underlying thin flexible sheet as at 16 or in accordance with the embodiment of FIG. 2, fluid may seep between the relatively rigid planar member 12 and the underlying relatively rigid planar member 14 in that embodiment. Thus, both for the air jacking structures and the plenum chambers associated with the air pallet, if one is employed, fluid dispersion means are required as well as means to permit jacking of the load without ballooning of the structure sidewall.

Referring next to FIG. 3, an air pallet 10' with integral jacking structure has controlled delivery of pressurized gas (air) to the jacking plenum chamber or the air bearing plenum chamber, as desired, or pressurization of both simultaneously, to some degree. In that respect, the basic structure is similar to that embodiment of FIG. 1, the air pallet 10' in this case being comprised of an upper relatively rigid planar backing member 12 directly bearing the load L, an intermediate relatively rigid planar jacking member indicated generally at 14 and the bottom of the structure bearing a thin flexible sheet as indicated generally at 16 with the bottom portion 16*b* being perforated by way of perforations 18 identical to that of the first embodiment. Further, the periphery of sheet 16 forms a flexible band 16*a* being sealably affixed to the peripheral edges of 14*a* and 12*a* of members 14 and 12 respectively to form an upper jacking plenum chamber 24 and a lower air bearing plenum chamber 20. A hole 56 within planar member 12 to the left permits air or other gas under pressure to enter plenum chamber 24, the air exiting from the opposite or right side through hole 38 within intermediate relatively rigid planar jacking member 14. The structure is characterized by two additional elements, the pressurized gas or air distribution member assembly, indicated generally at 86, and the utilization of a closed internal jacking assembly 100. The purpose of the air pallet 10' is to permit particularly where it is difficult to jack the load, an arrangement where air pressure is initially applied purely to effect jacking of the load. In that respect, a nozzle chamber 87 is formed by a sealed casing including inclined walls 90 and 92, flanged at 90*a* and 92*a* respectively, and sealably and fixedly mounted to the upper surface of planar member 12 the assembly. Laterally opposed side walls as at 91, also act to form sealed chamber 87. Inclined side wall 90 bears an opening 94 within which is positioned a detachable coupling 30' identical to that shown in the embodiment of FIG. 2, for feeding a gas such as pressurized air is indicated by arrow A through flexible hose 28 to the pallet 10'. An L shaped slide 88 is slidably mounted interiorly of chamber 87 and is actuated by means of an L shaped actuating rod 96 sliding through a bushing 97 and fixed at its inboard end to the slide 88. The slide bears a circular hole 98, conforming to the diameter of hole 56 within planar member 12, so that, when the hole 98 is centered with hole 56 air flow is unimpeded to the jacking plenum chamber 24. This occurs when the slide 88 is shifted to the left as indicated by the dotted line 96' for the actuator 96. However in the full line position shown, air is prevented from entering the jacking plenum chamber 24 but allowed to pass from chamber 87 of air nozzle assembly 86 and exit through the nozzle outlet hole 98 for passage into the interior air jacking assembly 100.

In that regard, the jack assembly 100 comprises upper and lower planar members 102 and 104 joined by a endless flexible strip material band 106 sealed at its edges to the respective peripheries of planar members 102 and 104 much in the same manner that the flexible band 16*a* joins planar members 12 and 14. An elastic string 26 provides the corrugated effect and biases the assembly to collapsed position as does the elastic string 26 for flexible bands 16. Planar member 102 bears a circular hole as at 102*a* aligned with hole 84 within the overlying planar member 12. A short length tube 108 has its ends mounted within holes 84 and 102*a* to form an inlet air passage for air or other gas under pressure directed to the interior 101 of the air jacking assembly 100. The tube 108 and a number of posts 110 assure fixed spacing between the overlying planar member 12 and the upper planar member 102 of assembly 100. The bottom planar member 104 rests on planar member 14. When the air nozzle assembly 86 is in position shown in FIG. 3 there is no air bearing or pressurized air film provided beneath the structure 10', all of the air passes to the confined chamber 101 in this mode and a large mass load such as load L may be readily lifted prior to the air pallet functioning as an air pallet by the creation of a frictionless air bearing to the bottom of the assembly 10'. Partial jacking and partial air bearing effects may be achieved by shifting the slide 88 to the left so that the hole 98 overlies partially both openings or holes 56 and 84, causing some air to enter chamber 101 while simultaneously some air, exiting from chamber 87 of the air nozzle assembly, passes first to the air bearing jacking plenum chamber 24 and then through hole 38 to the air bearing plenum chamber 20 and finally exiting through the perforations 18 within flexible sheet 16. If the slide 88 is all the way to the left as shown by the dotted line position of the actuator 96 at 96', chamber 101 is unpressurized, and controlled jacking of load L and the creation of thin air bearing film is created similarly to that of the embodiment of FIG. 1.

As may be appreciated, the air nozzle assembly 86 may take the form of a pivotable tube directly connected to hose 18, whose open end simply pivots across the side by side holes 56 and 84 within the upper planar backing member 12 to selectively feed air to the jacking assembly 100 or to the jacking plenum chamber 24 and thence air bearing plenum chamber 20 by flow therethrough or by partial supply to both chambers 24 and 101 in unison. Further, the internal jacking assembly 100 may take other forms such as being constituted by an air bag or the like whose inlet is sealed to hole 84 within the upper planar backing member 12 and which occupies a portion of the jacking plenum chamber 24.

Figure 4:
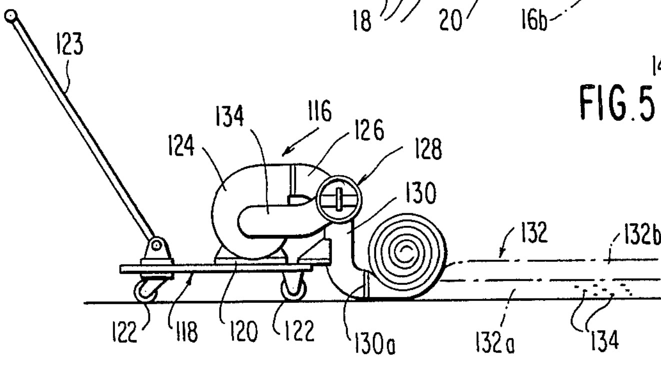
FIG. 4 is a side elevational view of an air pallet as applied to a conventional wooden pallet, forming yet another embodiment of the present invention.
Figure 4:
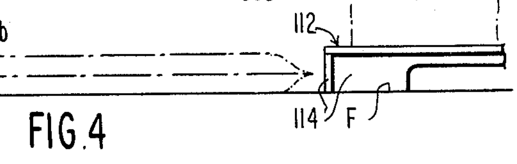
Figure 5:
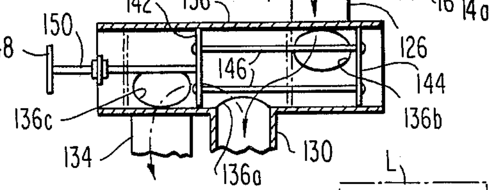
FIG. 5 is a sectional view of a vacuum/positive air pressure control valve forming a part of the system of FIG. 4.
Figure 6:
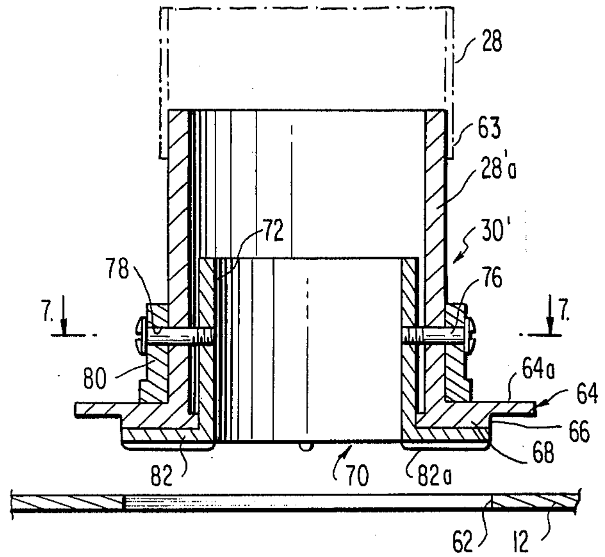
FIG. 6 is an exploded view, partially in vertical section, of the detachable hose coupling employed in the embodiment of FIG. 2.
Figure 7:
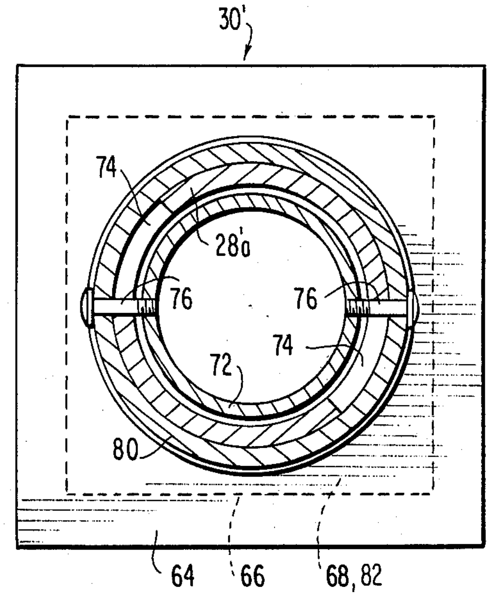
FIG. 7 is a horizontal sectional view of a portion of the detachable hose coupling of FIG. 6 taken about line 7—7.
Figure 8:
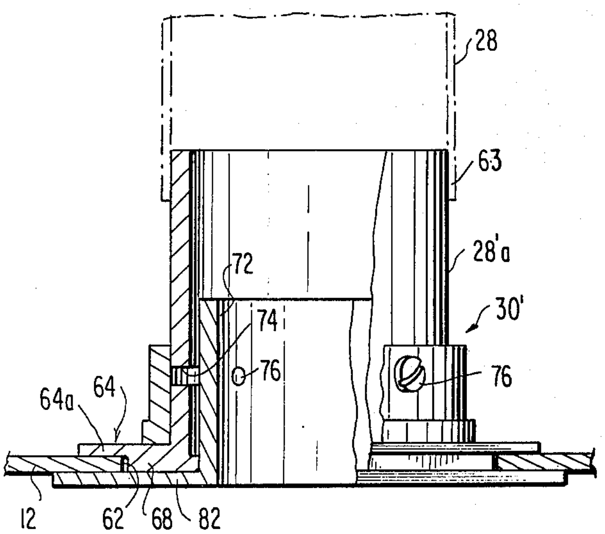
FIG. 8 is a vertical sectional view of a portion of the jacking structure of FIG. 2 showing the detachable coupling in coupled position.
Figure 9:
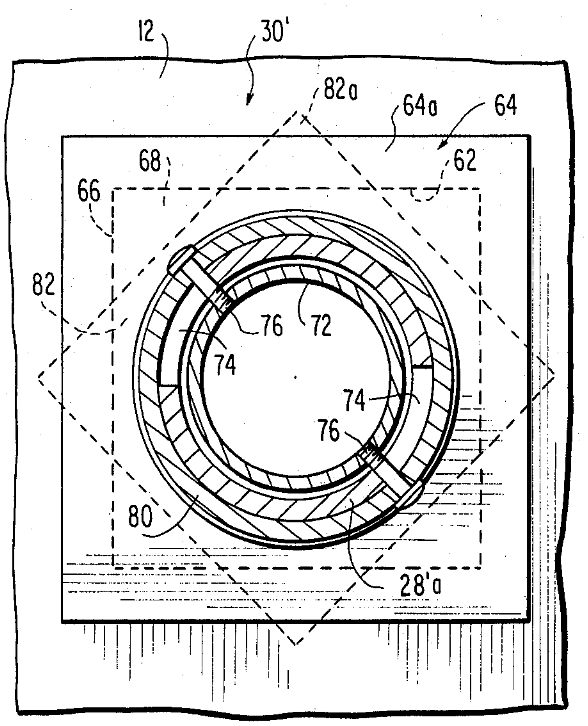
FIG. 9 is a horizontal sectional view similar to that of FIG. 7 with the parts in coupled position.

Referring next to FIGS. 4 and 5, another embodiment of the present invention permits the vertical jacking and transport of a load L riding upon a standard wooden pallet indicated generally at 112 which is shown in FIG. 4 as resting on an underlying load support surface F, the pallet 112 conventionally known as a platform pallet bearing a number of dependent runners as at 114 and forming an open framework with multiple parallel longitudinally extending cavities. This embodiment of the invention envisions a movable compressed air source as at 116 taking the form of a wheeled truck indicated at 118 and formed of a platform 120 mounted for movement by way of castors 122 and manually propelled by means of a handle 123 horizontally over the load support surface or floor F. The platform 120 supports a blower or fan as at 124 driven by a gasoline engine or the like (not shown) the outlet of the fan being connected to a tubular fan discharge pipe or tube as at 126. A control valve assembly indicated generally at 128 supplies either vacuum pressure or a positive air pressure through a supply tube 130 to an air bearing tube 132. Tube 132 may comprise an elongated, round tube of a thin flexible plastic material such as polyethylene sealed except for perforations as at 134 on the bottom surface **132*a* of the thin filled tube. The upper surface 132*b* is not perforated. Under operation, the tube is projected as indicated in dotted line from the rolled up full line position by the application of air under pressure to the tube 132 from a blower or fan 124. Retraction from the extended position occurs by application of suction pressure rather than positive air pressure to the interior of tube 132. This is achieved in the illustrated embodiment by means of the valve mechanism 128 more clearly seen in FIG. 5. In their regard, a suction tube 134 extends from the cylindrical valve casing 136 to the side of the blower or fan 124. Outlet pipe 126 for the blower opens to the cylindrical casing 136 by way of a hole 136*b* at the opposite end of the cylindrical casing. Intermediate of the two types of tubes or pipes 134, 126 is the valve supply pipe or tube 130 connected to a flexible tube 132 by way of a collar 130*a* and opening to valve casing 136 at 136*a*. The opening 136*a* within the cylindrical casing 136 permits selectively, either a suction pressure or a positive air pressure to be supplied by way of valve supply pipe 130 to the flexible tube 132. The control valve 128 makes use of a piston assembly comprised of longitudinally spaced disks 142, 144 joined by connecting rods 146 and an actuating handle 148 mounted by way of a rod 150 to the center of one of the disks 142. The two disks 142, 144 define a captured volume therebetween, providing the valving function. As indicated in the full line position, a positive air pressure is delivered from the fan or blower 124 through the fan discharge pipe 126 and through the valve supply pipe 130 to the flexible tube 132. If shifted to the dotted position as shown, the right hand disk 144 seals off the fan or blower discharge pipe 126 from the valve outlet pipe 130. However, now the suction pipe 134 leading to the suction side of the blower 124 is open to the tube 132 interior, with the disk 142 to the left side of opening 136*c* and the disk 144 just to the right of the opening 136*a* within cylinder 136. The suction and pressure flow are indicated appropriately by the arrows in FIG. 5**.

The flexible tube 132 is of a diameter sized to the opening or cavity within the wooden pallet 112 to which it is fitted, when partially inflated, and when it is in its projected dotted line position FIG. 4 the wheeled unit 116 is moved to the right forcing the tube 132 to penetrate the cavity and underly the platform pallet supported by the runners 114 above the surface F. Under full inflation, the air pallet is lifted since the diameter of tube 132 is in excess of the vertical height of the air pallet above the load support surface F. Further, an air bearing film is created under the principles of this invention and common to that of the prior art platents discussed previously. The wooden pallet lifts off the ground on an air film which develops and which is capable of maintaining a substantial load L on a frictionless air bearing with the only friction derived by the castors or wheels 122 of unit 116.

In an effort to simplify the apparatus of FIG. 4, the valve 136 may be eliminated and only the positive air pressure discharged from the blower 124 need flow to a modified tube 132. In this case the tube is formed of bimetallic upper and lower tube halves as at **132*b*, and 132*a* the bimetals providing a structural property to the tube such that when it is not inflated under the positive air pressure, the thin wall bimetalic tube self rolls to the full line rolled up position as shown in FIG. 4** without the necessity to apply suction pressure to achieve that result. Other variations and changes in this embodiment as well as the other preferred embodiment as shown and described with particularity may be made without departing from the spirit in scope of the invention.

While the embodiment illustrates a single tubular flexible tube 132 as projectable within a single longitudinally extending cavity below or beneath the platform 113 of the wooden pallet 112 as a standard, there are plural side by side cavities and it is envisioned, that the air tube 130 comprise multiple tubes may be bifurcated by the bottom and bear a plural side by side flexible tubes 132 functioning in the manner of the single tube described in the embodiment.

Figure 10:
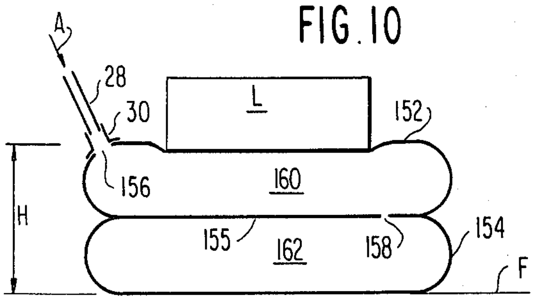
FIG. 10 is a schematic, vertical sectional view of a jacking structure forming yet another embodiment of the present invention.

Referring next to FIG. 10, there is shown schematically a dynamic fluid pressure jacking structure of extremely simplified form and formed of thin flexible sheet material except for the load itself. Assuming that the load L comprises a carton and functions as a solid structure, two plastic bags as at 152, 154 thermally welded together at their interface 155 function to form plenum chambers as at 160 and 162. Keeping in mind that such structures are required to have anti-ballooning means as well as air dispersion means, in the simplified arrangement, air dispersion is effected by providing to one side of the load L, an air inlet hole as at 156 for permitting the fluid stream A such as air to enter plenum chamber 160, while the outlet hole 158 communicating the upper plenum chamber 160 to the lower plenum chamber 162 is outside of load L or the shadow thereof to the right and to the opposite side of the assembly from inlet hole 156. The cross-sectional area of the hole 158 is considerably less than the hole 156 and is preferably about one-half that of the inlet hole. Conventionally, a hose 28 terminating at connector or coupling 30 allows the air stream to pressurize the jacking structure. The lowermost plenum chamber 162 does not have an outlet, and jacking of the load L to a height H occurs to the extent where the back pressure within the chambers 160, 162 matches that of the incoming air stream A from a source (not shown). Stability in jacking results in the same manner as the previous embodiments, the chamber 160 pressurizing prior to full pressurization of chamber 162. With the inlet air entering chamber 160 to the left of the load and the same air at a faster rate exiting from the smaller hole 158 to the opposite side, stablized jacking of the load L upwardly occurs in the manner the prior embodiments.

As may be appreciated, there are two relatively rigid surfaces, the first provided by the load L and the second provided by the floor or underlying relatively rigid support surface. All of the jacking structures need lateral displacement of the inlet and outlet, preferably to opposite sides of the load L for each jacking chamber except the lowermost which needs no outlet, although such may be employed as at 60, FIG. 2. The chambers may be formed of relatively rigid planar members or simply of air bags as at 152, 154. Ribs or the like may be provided to assure air dispersion necessary to initiate jacking, since a load L will compress the structure, particularly air bags, to flatten them, so that initially there is little if any volume open for air entry at opening 156. In the embodiment of FIG. 10, anti-ballooning is effected by surface bonding between lower bag 154 and upper bag 152 over a substantial extent of their contacting surfaces.

While the invention has been particularly shown and described with reference to preferred embodiments thereof, it will be understood by those skilled in the art that the foregoing and other changes in form and details may be made therein without departing from the spirit and scope of the invention.

I claim:

1. A dynamic air pressure jacking structure with improved load stability for a load carried thereby and jacked vertically upwardly from an underlying relatively rigid support surface, said structure comprising:

flexible film means forming a jacking plenum chamber and bearing said load, an air inlet hole leading to said jacking plenum chamber to one side of the load, an air outlet hole leading from said jacking chamber and laterally to the side of said inlet hole and to the opposite side of said load from said air inlet hole, means for supplying compressed air fluid to said inlet hole, for flow through said jacking plenum chamber and for discharge through said outlet hole, and wherein the cross-sectional area of the outlet hole is substantially less than the cross-sectional area of said inlet hole such that the load is jacked vertically upwardly without danger of tipping, and wherein said air outlet hole functions as least partially to provide an anti-ballooning effect to said dynamic fluid pressure jacking structure.

2. The jacking structure as claimed in claim 1, wherein said flexible film means forming said jacking plenum chamber comprises a plurality of vertically stacked, relatively rigid planar members, an endless flexible band is sealed to the peripheries of said members, with said members spaced apart to form said jacking plenum chamber, said load overlies the upper of said relatively rigid planar members, said air inlet hole is provided within the upper of said members and said air outlet hole is provided within the lower of said members.

3. The jacking structure as defined by claim 2 wherein the cross-sectional area of the outlet hole within the lower relatively rigid planar member for said given jacking plenum chamber is approximately one-half the cross-sectional area of the inlet hole within upper planar member for said given jacking planar member.

4. The structure as claimed in claim 2 wherein an elastic strip compressively surrounds said flexible band at a position intermediate of said relatively rigid planar members for each of jacking plenum chamber to effect inwardly folding of said flexible bands in the absence of gas pressurization of the plenum chambers.

5. The jacking structure as claimed in claim 2, wherein said flexible band comprise the peripheral portion of a thin flexible sheet having a central bottom portion which underlies the lower of the relatively rigid planar members and is edge sealed thereto and wherein the bottom of said thin flexible sheet bears over a major surface area from its center, a plurality of perforations unrestrictably opening to the interior of said thin flexible sheet to thereby form a lower plenum chamber and said structure comprises a combined air pallet and jacking structure.

6. The jacking structure as claimed in claim 5, further comprising an internal jacking structure comprising an expandable chamber within said jacking plenum chamber defined by third and fourth relatively rigid planar members, and wherein said upper relatively rigid planar member further comprises a second hole laterally adjacent to the first hole within said upper relatively rigid planar member and communicating through said third relatively rigid planar member to said jacking plenum chamber and a nozzle assembly operatively positioned with respect to said laterally adjacent holes and comprising means for selectively supplying air under pressure to said first or second hole or to both holes jointly to achieve independently, total jacking by means of said internal jacking structure or partial jacking by said jacking plenum chamber provided by said vertically spaced third and fourth relatively rigid planar members and simultaneously a frictionless air bearing by escape of pressurized air through the perforations of said thin flexible sheet underlying the lower most relatively rigid planar member thereof.

7. The structure as claimed in claim 6 wherein, said nozzle assembly comprises an air nozzle chamber, sealed to the top of said upper relatively rigid planar member, overlying said laterally spaced holes within that member, and wherein a longitudinal slide valve bearing a single opening within alignable with said holes the same slidably overlies said laterally spaced holes and is selectively movable relative to said holes to permit flow through either one of said holes in the absence of the other, or jointly through both holes.

8. The dynamic fluid pressure jacking structure as claimed in claim 5, further comprising valve means for selectively closing off said outlet hole such that said structure functions purely as a jacking structure or as a combined air pallet and jacking structure, depending upon the condition of said valve.

9. The dynamic fluid pressure jacking structure as claimed in claim 8, wherein said lower relatively rigid planar member bears a further hole underlying and aligned with the air inlet hole carried by said upper relatively rigid planar member, and wherein second valve means selectively open and close said second hole such that with said second valve means closed, fluid under pressure feeds the upper plenum chamber to effect jacking of said load, and with said second valve means open, fluid under pressure bypasses the upper plenum chamber and directly enters the lower plenum chamber for creation of a fluid pressure frictionless air bearing between said thin flexible sheet and said relatively rigid support surface.

10. The jacking structure as claimed in claim 2, wherein said means for supplying compressed air to said jacking plenum chamber comprises a hose supplying air under pressure, a coupling at the end of said hose mounted to said relatively rigid planar backing member, said coupling comprises: a collar, a rigid outer tube within said collar and fixedly mounted at one end to said hose and including a first flange at the other end for contact with the outer surface of the upper relatively rigid planar member outside of said air inlet hole, a second, smaller diameter rigid inner tube rotatably mounted internally of said first tube connected to said collar and terminating in a radially outwardly projecting second flange sized to said air inlet hole, projecting beyond said hole and wherein said second flange comprises radial projecting portions such that relative rotation of said collar said internal tube and the second flange carried thereby causes, upon rotation, the radial projecting portions of the second flange borne by said internal tube to underly the bottom of said upper relatively rigid planar member adjacent the hole therein to sealably lock said coupling to that planar member.

11. The jacking structure as claimed in claim 10, wherein said air inlet hole within said upper relatively rigid planar member is rectangular, and said outer tube flange at its lower end contacting the upper surface of said upper relatively rigid planar member is stepped to include a portion projecting within the rectangular hole of said upper relatively rigid planar member and being sized thereto and of a thickness generally equal to the thickness of the upper relatively rigid planar member, and wherein said second flange on said inner tube is of similar configuration and sized to the stepped portion of the flange of the outer tube and to the rectangular air inlet hole within said upper relatively rigid planar member.

12. The jacking structure as claimed in claim 11 wherein, a pair of diametrically opposed arcuate slots are provided within the side of said outer tube and wherein, screws mounted to said collar and projecting through respective slots engage the inner tube to maintain it vertically in place and to permit, when said collar is rotated, said inner tube to rotate to displace the second flange of the inner tube with respect to the stepped portion of said first flange nested within the hole of said upper relatively rigid planar member.

13. A detachable coupling for an air pressurized jacking structure, air pallet or the like, wherein compressed air is supplied to a plenum chamber partially defined by an upper, relatively rigid, planar member bearing an air inlet opening within the same, said coupling comprising:

a first rigid outer tube external to the outer surface of said upper, relatively rigid, planar member;

a collar concentric on said outer tube;

a second smaller diameter rigid inner tube rotatably mounted internally of said first tube, connected to said collar and terminating in a radially outwardly projecting flange sized to said opening within said upper, relatively rigid, planar member and projecting beyond said opening;

and said opening and said flange comprising radially projecting portions;

whereby, relative rotation of said collar, said internal tube and the flange carried by said internal tube causes, upon rotation, the radial projecting portion of the flange borne by said internal tube to underlie the bottom of said upper, relatively rigid, planar member adjacent the opening therein to sealably lock said coupling to said planar member.

14. The detachable coupling as claimed in claim 13, wherein said opening within said upper, relatively rigid, planar member is rectangular, said outer tube is provided with a flange at its lower end contacting the surface of said upper, relatively rigid, planar member, said flange being stepped to include a portion projecting within said rectangular hole of said upper, relatively rigid, planar member, and being sized thereto and of a thickness generally equal to the thickness of the upper, relatively rigid, planar member, and wherein said flange on said inner tube is of similar configuration and sized to the stepped portion of the flange of said outer tube and to the rectangular opening within said upper, relatively rigid, planar member.

15. The detachable coupling as claimed in claim 14, wherein a pair of diametrically opposed, arcuate slots are provided within the side of said outer tube, and wherein screws mounted to said collar and projecting through said slots engage the inner tube to maintain it vertically in place and to permit, when the collar is rotated, said inner tube to rotate therewith to displace the flange of the inner tube with respect to the stepped portion of the flange of said outer tube nested within the opening of said upper, relatively rigid, planar member.

16. In combination with a platform pallet having depending runners normally engaging a supporting surface and forming at least one elongated cavity beneath a platform load bearing surface, a horizontal platform for movement across the surface relative to the load bearing platform pallet, a motor driven air blower mounted on said platform bearing a discharge tube discharging a positive pressure air flow, an elongated flexible tube mounted to the discharge tube of the blower for retraction and projection longitudinally into extended position beneath the platform pallet load and within the cavity between runners, said thin flexible tube including perforations on the bottom surface thereof opening unrestrictedly to the interior of the tube, said tube having a diameter such that when fully inflated by operation of said blower, said load and said platform pallet is lifted from said supporting surface, and means for effecting retraction of said tube from said cavity beneath said platform pallet load and for rolling up of said tube towards said blower upon termination of positive pressure air flow from said blower to said tube.

17. The combination as claimed in claim 16, wherein said means for causing retraction of said tube from said cavity and for causing said tube to roll up towards said blower comprises bimetallic upper and lower halves of said tube, such that automatically upon termination of operation of said blower, said tube deflates and rolls up on itself.

18. The combination as claimed in claim 16, wherein said thin flexible tube is formed of plastic film, and wherein said means for causing retraction of said tube and rolling up said tube in a direction towards said blower comprises a valve mechanism interposed between said blower and said tube, said blower including a positive pressure air discharge tube and a suction inlet tube, and wherein said valve means comprises means for selectively connecting said flexible tube to said positive air pressure flow discharge tube for said blower to effect elongation of said tube, or to suction inlet tube to said blower to effect suction retraction of said flexible tube and roll up.

* * * * *